UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS OF PREPARING HYDROGEN.

1,425,578.  Specification of Letters Patent.  Patented Aug. 15, 1922.

No Drawing.   Application filed May 14, 1920.  Serial No. 381,506.

*To all whom it may concern:*

Be it known that I, JOHN COLLINS CLANCY, a subject of the King of Great Britain, residing at Providence, in the county of Providence and State of Rhode Island, have invented certain new and useful Improvements in Processes of Preparing Hydrogen, of which the following is a specification.

This invention is a novel process for the production of pure hydrogen and other products by the reaction of steam upon elemental sulfur at an elevated temperature, the invention being applicable with especial advantages to the preparation of hydrogen intended for use in the direct synthesis of ammonia and required to be of exceptional purity. As is well known, one of the chief difficulties encountered in the preparation of ammonia by direct union of hydrogen and nitrogen lies in the economic preparation of hydrogen in a state of sufficient purity for the very stringent requirements of this reaction.

I have discovered that if elemental sulfur in vapor phase be subjected to direct contact at a sufficient temperature with superheated steam, a reaction ensues according to which sulfur dioxid and hydrogen are formed in accordance with the equation:—

$$S + 2H_2O = SO_2 + 2H_2.$$

The reaction may be carried out by subjecting commingled vapors of pure sulfur and superheated steam to a temperature of 500–1000° C. in a quartz or other refractory tube furnace, which may be heated externally, either electrically or by other appropriate means. Preferably the steam is supplied in sufficient excess of the reaction requirements to insure complete oxidation of the sulfur. An operating temperature of approximately 800° C. has been found satisfactory in practice although higher or lower temperatures may be used.

The exit gas consists essentially of sulfur dioxid and hydrogen, together with any excess of water vapor which may have been used. The separation of the components may be accomplished in a variety of ways. For example the resulting gas mixture may be brought into contact with any appropriate absorbent for sulfur dioxid, or for sulfur dioxid and moisture, including the hydroxids of the alkali or alkali earth metals, etc., and will yield directly hydrogen in a state of substantial purity. Among the many available methods for effecting a separation between the sulfur dioxid and the hydrogen the following may be mentioned:

1. The application of the known sulfur dioxid liquefaction processes, the hydrogen being further purified by known methods as may be required for specific purposes.

2. The adsorption of the sulfur dioxid from the gas mixture by means of the gel of silicic acid, which permits the hydrogen to pass in substantial purity. The adsorption from this particular gas mixture is reversible, so that by heating the silica gel the sulfur dioxid is readily expelled and may be utilized for any desired purposes. For example the sulfur dioxid thus prepared is eminently suitable for the manufacture of sulfuric acid by the platinum-contact process: or alternatively, it may be caused to react with sodium carbonate for the preparation of sodium sulfite or bisulfite, the evolved carbon dioxid being collected as a by-product.

3. The sulfur dioxid may be absorbed in water in a known manner and subsequently liberated in a state of substantial purity as regards contaminants other than water vapor, which is readily eliminated by known dehydrating methods.

4. For use more particularly in case the hydrogen component of the gas mixture is to be employed for the direct synthesis of ammonia by reaction with nitrogen, I prefer to utilize as the absorbent for the sulfur dioxid the ammonia derived from the synthesis itself, whereby certain results of the highest technical value are attained, viz:—

In the first place, this ammonia has been prepared from fully purified gases and is therefore not liable to introduce into the system contaminating impurities of a nature to interfere with the proper conduct of the catalysis.

In the second place the ammonia resulting from the synthesis is thereby transformed directly into ammonium sulfite, which may thereafter be oxidized to ammonium sulfate in any known or approved manner, the process thus yielding the ammonia directly in the form of a standard merchantable product.

The nitrogen required for the ammonia synthesis may be supplied in sufficiently pure form from any suitable source, being derived for example from atmospheric air through the known liquefaction and fractionation methods.

The process herein described is to be distinguished from the known methods for the desulfurizing of ores by means of superheated steam, since the latter methods, even when hydrogen occurs among the by-products of reaction, are incapable by reason of the impurities existing in or accompanying sulfid ores, of yielding the gas in a state of substantial purity. Sulfur as obtained by modern extraction methods is among the purest substances available in chemical industry, and the same statement applies to water vapor: hence a direct reaction between these substances, both in a state of substantial purity, is applied with great advantage whenever hydrogen of the highest available purity is required.

I claim:—

1. Process of preparing substantially pure hydrogen, comprising reacting with steam upon elemental sulfur at a temperature of at least 500° C., and absorbing the sulfur dioxid from the gaseous reaction product.

2. Process of preparing substantially pure hydrogen, comprising reacting with steam upon sulfur at a temperature of at least 500° C., and absorbing the sulfur dioxid from the gaseous reaction product by means of ammonia.

3. Process of preparing substantially pure hydrogen comprising reacting with steam upon sulfur at a temperature of at least 500° C., absorbing the sulfur dioxid from the gaseous reaction product by means of ammonia, combining the purified hydrogen with nitrogen to form ammonia, and absorbing sulfur dioxid from a further quantity of said gaseous reaction product by means of the formed ammonia.

4. Process of preparing substantially pure hydrogen, comprising reacting with superheated steam upon elemental sulfur at temperatures of at least 500° C., and removing sulfur dioxid from the gaseous reaction product.

5. Process of preparing substantially pure hydrogen, comprising reacting with steam upon elemental sulfur at a temperature of approximately 500°–1000° C. and separating sulfur dioxid from the gaseous reaction product.

In testimony whereof, I affix my signature.

JOHN COLLINS CLANCY.